United States Patent
Rodrigues Rosa Junior

(10) Patent No.: US 11,327,744 B2
(45) Date of Patent: May 10, 2022

(54) EQUIVALENCY OF REVISIONS ON MODERN VERSION CONTROL SYSTEMS

(71) Applicant: Red Hat, Inc., Raleigh, NC (US)

(72) Inventor: Cleber Rodrigues Rosa Junior, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/425,078

(22) Filed: May 29, 2019

(65) Prior Publication Data
US 2020/0379752 A1  Dec. 3, 2020

(51) Int. Cl.
    G06F 9/44     (2018.01)
    G06F 8/71     (2018.01)
    G06F 16/13    (2019.01)

(52) U.S. Cl.
    CPC .............. *G06F 8/71* (2013.01); *G06F 16/137* (2019.01)

(58) Field of Classification Search
    CPC ................................. G06F 8/71; G06F 16/137
    See application file for complete search history.

(56) References Cited

U.S. PATENT DOCUMENTS

| | | | | |
|---|---|---|---|---|
| 6,434,683 B1* | 8/2002 | West | ...................... | G06F 3/0613 711/161 |
| 6,651,186 B1* | 11/2003 | Schwabe | ............. | G06F 9/44589 714/38.14 |
| 6,701,392 B1* | 3/2004 | Halstead | ............... | G06F 3/0601 710/16 |
| 6,883,163 B1* | 4/2005 | Schwabe | ................... | G06F 8/71 713/155 |
| 6,883,168 B1* | 4/2005 | James | ....................... | G06F 8/60 717/178 |
| 6,981,245 B1* | 12/2005 | Schwabe | ............. | G06F 9/44589 713/155 |
| 8,271,949 B2* | 9/2012 | Bernardini | ............ | G06F 11/366 717/124 |
| 8,768,962 B2 | 7/2014 | Laron | | |
| 8,812,570 B2* | 8/2014 | Schneider | ............. | G06F 16/325 708/250 |
| 8,850,547 B1* | 9/2014 | Feeser | ..................... | H04L 67/34 726/9 |
| 9,063,748 B1* | 6/2015 | Bakale | ...................... | G06F 8/71 |
| 9,098,500 B1 | 8/2015 | Asokan et al. | | |
| 9,141,354 B2* | 9/2015 | Kuznetsov | ................ | G06F 8/42 |
| 9,213,536 B2* | 12/2015 | Ocher | ....................... | G06F 8/65 |
| 9,575,993 B2* | 2/2017 | Pfeifle | ..................... | G06F 16/29 |
| 9,734,043 B2* | 8/2017 | Crova | .................. | G06F 11/3676 |
| 9,904,544 B2* | 2/2018 | Thomas | .................... | G06F 8/77 |
| 2002/0073068 A1* | 6/2002 | Guha | .................. | G06F 16/9014 |
| 2004/0210885 A1* | 10/2004 | Wang | ........................ | G06F 8/71 717/158 |

(Continued)

*Primary Examiner* — Adam Lee
(74) *Attorney, Agent, or Firm* — Lowenstein Sandler LLP

(57) ABSTRACT

Disclosed herein is technology to compare different versions of a code object to determine if the versions include equivalent changes. An example method may include: determining a set of changes of a first version of a code object, wherein the code object comprises a plurality of versions; generating a first hash in view of the set of changes; accessing a second hash representing a set of changes of a second version of the code object; comparing, by a processing device, the first hash and the second hash; and indicating the set of changes of the first version and the set of changes of the second version are equivalent.

16 Claims, 7 Drawing Sheets

(56) References Cited

U.S. PATENT DOCUMENTS

| | | | |
|---|---|---|---|
| 2005/0033777 A1* | 2/2005 | Moraes | G06F 16/27 |
| 2005/0071390 A1* | 3/2005 | Midgley | G06F 11/1464 |
| 2005/0257205 A1* | 11/2005 | Costea | G06F 8/65 717/168 |
| 2005/0262495 A1* | 11/2005 | Fung | G06F 8/65 717/170 |
| 2007/0179787 A1* | 8/2007 | Jan | G06F 8/656 704/270 |
| 2009/0271779 A1* | 10/2009 | Clark | G06F 16/137 717/171 |
| 2012/0016882 A1* | 1/2012 | Tofano | G06F 7/00 707/747 |
| 2012/0324435 A1* | 12/2012 | Somani | G06F 8/30 717/170 |
| 2013/0055231 A1* | 2/2013 | Hyndman | G06F 8/658 717/169 |
| 2013/0066901 A1* | 3/2013 | Marcelais | G06F 16/137 707/769 |
| 2013/0067449 A1* | 3/2013 | Sannidhanam | G06F 8/60 717/170 |
| 2013/0173530 A1* | 7/2013 | Laron | G06F 16/1734 707/608 |
| 2013/0339941 A1* | 12/2013 | Shelton | G06F 9/4451 717/172 |
| 2015/0301823 A1* | 10/2015 | Hatakeyama | G06F 8/71 717/173 |
| 2015/0324178 A1* | 11/2015 | Arnold | G06F 8/71 717/121 |
| 2016/0125185 A1* | 5/2016 | Wang | G06F 8/71 726/23 |
| 2016/0203313 A1* | 7/2016 | El-Moussa | G06F 21/57 726/23 |
| 2017/0177608 A1* | 6/2017 | Cismas | G06F 16/176 |
| 2018/0157487 A1* | 6/2018 | Thomas | G06F 21/64 |
| 2018/0349129 A1* | 12/2018 | Ju | G06F 8/654 |
| 2019/0056931 A1* | 2/2019 | Ding | G06N 3/105 |
| 2019/0155598 A1* | 5/2019 | Bainville | G06F 8/71 |
| 2020/0081697 A1* | 3/2020 | Sillankorva | G06F 8/30 |

* cited by examiner

EQUIVALENCY OF REVISIONS ON MODERN VERSION CONTROL SYSTEMS

TECHNICAL FIELD

The present disclosure is generally related to version control systems, and is more specifically related to determining versions of a computing object that include equivalent changes.

BACKGROUND

Version control systems enable a computer system to manage multiple different versions of an object. Each version may include one or more modifications that are absent from a prior or subsequent version. The version control system may store and organize the modified versions by using version identifiers. The version identifiers may enable particular versions (e.g., current or past) of the object to be accessed or compared.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
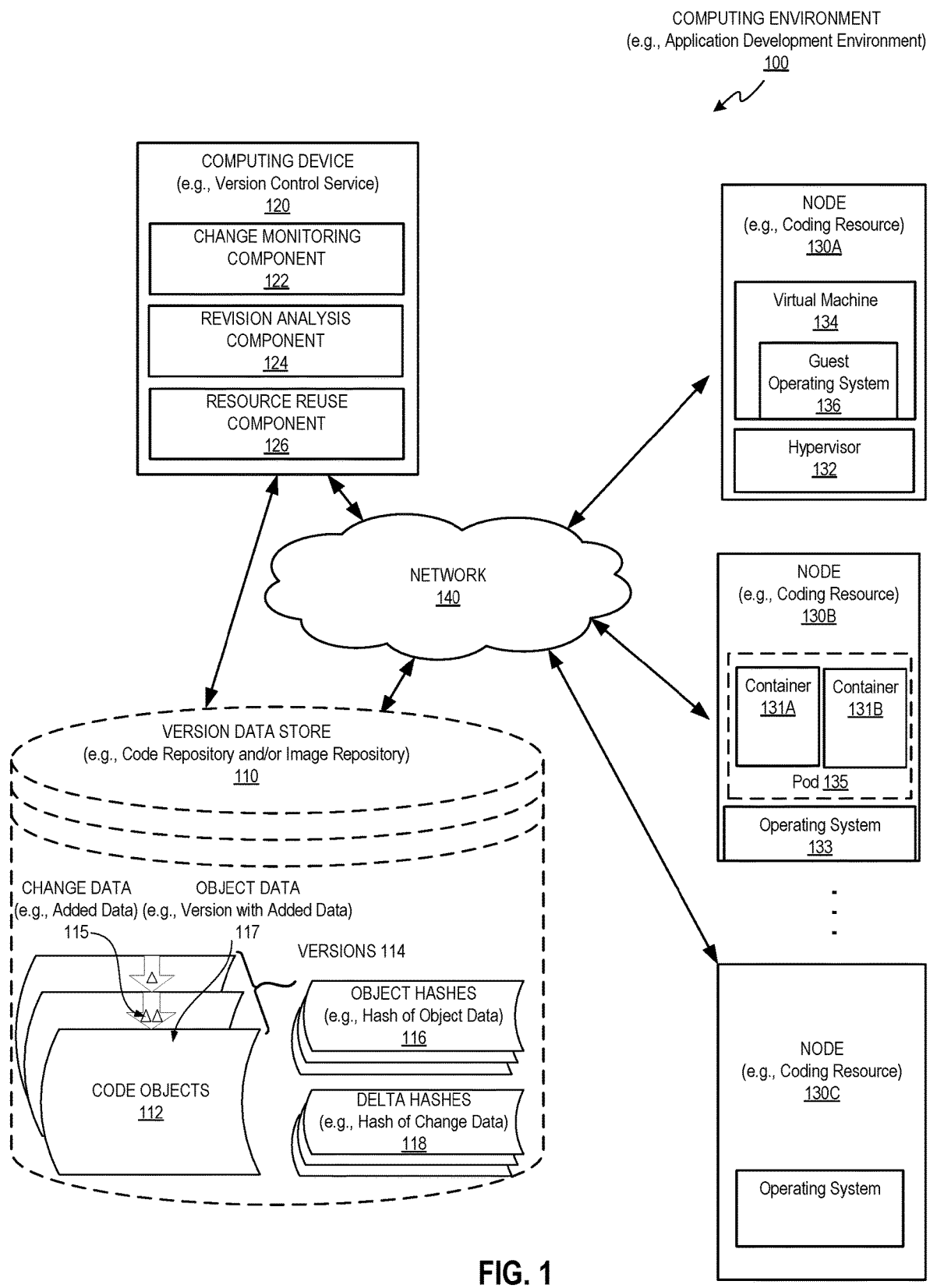
FIG. 1 depicts a high-level block diagram of an example computing environment, in accordance with one or more aspects of the present disclosure.

Modern version control systems often use hashes to more efficiently manage large numbers of object versions. Each hash may uniquely identify a particular version of an object (e.g., a computer program, a computer program module, a configuration file, etc.) and may be created based on the content of the version. When the content of the version changes, the hash may no longer identify the version and a new hash may need to be created. The hashes provide a spatially efficient manner to access and compare the different versions. The size of a hash may be much smaller than the version it represents and may be stored and compared using much less computing resources (e.g., storage space, processing power). The hashes in use by modern version control systems are often based on the data of each new version (e.g., output or result of a change) as opposed to data of the change (e.g., input) that caused the new version. The data being hashed for each new version may include the content of the version as well as the metadata for the version (author, date, etc). This may cause multiple versions with the same changes to have different hashes and cause a comparison using the existing hashes to indicate the versions are not equivalent.

Aspects of the present disclosure address the above and other deficiencies by providing technology that uses hashes that are based on the input data (e.g., change data) and not just hashes that are based on the output data (e.g., resulting object data of the new version). In one example, the technology disclosed herein may determine a set of changes of a version of a code object. The set of changes may be applied to the code object to create the version and the version may include the results of the set of changes. In some examples, the code object may be source code, a configuration file, an executable image, other data, or a combination thereof. The technology may generate a first hash in view of the set of changes (e.g., addition of new code) and access a second hash that represents a set of changes of another version of the code object. The hashes may be generated using a hash function before, during, or after the set of changes are applied to the code object (e.g., before or after creating a respective version). The technology may then compare the first hash and the second hash and when the hashes match, the technology may indicate the set of changes of the first version and the set of changes of the second version are equivalent. This may enable the coding resources that are associated with the first version to be shared or reused for the second version of the code object. The coding resources may include devices or data that were created, consumed, or configured for the first version. In some examples, the coding resources may relate to build resources (e.g., compiler output, build machine), provisioning resources (e.g., configured and deployed virtual machines or containers), testing resources (e.g., test results), other resources, or a combination thereof.

The systems and methods described herein include technology that enhances the computing field of version control systems. In particular, aspects of the present disclosure may enable a more resource efficient technique for determining whether different versions of a code object contain the same changes. In one example, the technology may be used to indicate that different versions include the same content even though metadata for the versions may be different. In another example, the technology may be used to indicate that different versions share a common change (e.g., defect fix) even though other portions of the content (e.g., other portions of code) may be different. In either example, this may be advantageous when a device or user wants to determine whether two different versions of the code object include a common change (e.g., bug fix, setting, program) for development, configuration, or testing purposes.

Various aspects of the above referenced methods and systems are described in details herein below by way of examples, rather than by way of limitation. The examples provided below discuss versions of a computing object that may be a single source code, configuration file, or image file. In other examples, a code object may be a set of code objects and a version of the set may correspond to a version of each constituent code object in the set, as discussed in more detail in regards to FIG. 2.

FIG. 1 illustrates an exemplary computing environment 100 in which implementations of the disclosure may operate. Computing environment 100 may provide a development environment or a production environment and may enable a user to develop, configure, test, and deploy programs. In one example, computing environment 100 may be the same or similar to RedHat® OpenShift®, Microsoft® Azure Devops®, Oracle® Application Express® (APEX), or other web-based or non-web-based development platform. Computing environment 100 may include a version data store 110, a computing device 120, a plurality of nodes 130A-C, and a network 140.

Version data store 110 may be a data store that stores one or more code objects 112 and each code object 112 may include one or more versions 114. Version data store 110 may be referred to as a source code repository, a program repository, an image repository, a document repository, other repository, or a combination thereof. Version data store 110 may include a single data storage device or multiple storage devices and may store data as one or more file system objects (e.g., files, directories), database objects (e.g., records), data blobs (e.g., continuous or non-continuous bit series), other data storage objects, or a combination thereof.

Version data store 110 may be a decentralized data store, a centralized data store, or a combination thereof. In the example shown in FIG. 1, version data store 110 may be a centralized content store that provides centralized access to code objects 112 and hashes 116 and 118. In another example (not shown), version data store 110 may be a decentralized content store that distributes code objects 112 and hashes 116, 118 across one or more storage devices (e.g., multiple heterogeneous or homogenous nodes). In either example, the version data store 110 may store one or more code objects 112.

Code objects 112 may be data structures that function as storage objects for object data. The storage objects may be in the form of file system objects (e.g., files, directories), database objects (e.g., records, tables, tuples, and value pairs), other data storage structure, or a combination thereof. Each of code objects 112 may include object data that may be in a human readable form, a non-human readable form, or a combination thereof. Object data of a code object may or may not be separated into object content and object metadata. The object metadata may provide descriptive information about the object content and may include object name (e.g., version identifier, object identifier), date (e.g., object creation date), user information (e.g., object or version creator, modifier). In the example shown in FIG. 1, a version of the code object 112 may include object data 117.

Object data 117 of a code object may include source code data, executable code data, configuration data, other data, or a combination thereof. The source code data may include a collection of words in a human-readable programming language that can be transformed from text (e.g., source code) into executable code for execution by a computing device. Source code data may be transformed by an assembler, compiler, linker, interpreter, other coding resource, or a combination thereof. The executable code data may include machine code that can be directly or indirectly executed by a processor of a computing device. The executable code data may include program data (e.g., executable or library), package data (e.g., an installation file), executable image data (e.g., virtual machine image, container image, or hard disk image), other data, or a combination thereof. The configuration data may include customizable settings that effect source code or executable code. The configuration data may be in the form of a file (e.g., configuration file), a database (e.g., registry entry), other form, or a combination thereof. A single code object can include any type of data and the data may be changed to produce versions 114.

Versions 114 may be versions of the same code object or versions of different code objects. When multiple versions are associated with a common code object they may be referred to as related versions, corresponding versions, similar versions, associated versions, or other term. A version of a code object may include a change to object data that is not present in another version and multiple versions of the same code object may include a common change. The arrangement and differences between versions are discussed in more detail in regards to the tree data structure 200 of FIG. 2. In one example, each of versions 114 may be different and therefore absent any duplicate versions. In another example, one or more of the versions may be identical and have the same or similar object data 117. In either example, a different version of the code object may be generated in view of change data 115.

Change data 115 may include one or more changes that can be applied to the code object to create a new version of the code object. Change data 115 may include changes to the content or metadata of the computing object. Change data 115 may include one or more instructions to perform the change (e.g., add, remove, modify) and content affected by the change (e.g., new or old object content). Some of the change data 115 may be incorporated into the new version of the code object and some of the change data may be absent (e.g., not incorporated) from all versions of the code object. For example, change data 115 may be used for updating the code object and may include both content data and position data. The content data may be the data (e.g., characters, data blocks) being updated (e.g., added, removed, replaced) and the position data may be a location in the code object that is effected by the update. The content data may be added to one or more versions of the code object but the position data may not be added to any version of the code object. Therefore, a portion of change data 115 may be absent, unincorporated, missing, or free from all versions of the code object and therefore every version of the code object may be missing, free of, or absent a portion of change data 115. Change data 115 is discussed in more detail in regards to FIG. 3.

Object hashes 116 and delta hashes 118 are both examples of hash values that may be generated by one or more hash function and may represent portions of data. An object hash may represent object data of a particular version of a code object (e.g., output of a change) and a delta hash may represent change data of a particular change that is applied to code object (e.g., the input change). The creation and use of object hashes 116 and delta hashes 118 are discussed in more detail in regards to hash function 220 of FIG. 2 and hash module 312 of FIG. 3. The hashes may be particularly useful because they may enable a computing device 120 to more efficiently access and compare versions 114 of code object 112.

Computing device 120 may include one or more physical or virtual computing devices that have access to a version data store 110 and provide a version control service to one or more client devices (e.g., nodes 130A-C). An example of computing device 120 is described in more details below with references to FIG. 7 and may be a rack mounted server, workstation, desktop computer, notebook computer, tablet computer, mobile phone, palm-sized computing devices, personal digital assistants (PDAs), etc. The version control service provided by computing device 120 may process client requests to access particular versions of coding object 112. Computing device 120 may integrate with one or more other services that generate, access, instantiate, deploy, or configure code objects 112. The version control service may be the same or similar to a Revision Control System (RCS), a Software Configuration Management system (SCM), a Source Code Control System (SCCS), a Version Control System (VCS), other system, or a combination thereof. In one example, the version control service may be the same or similar to GIT, Apache Subversion® (SVN), Concurrent Versions System (CVS®), Perforce®, AccuRev®, ClearCase®, Rational Team Concert®, Visual SourceSafe®, other product, or a combination thereof.

In the example shown in FIG. 1, computing device 120 may include a change monitoring component 122, a revision analysis component 124, and a resource reuse component 126. The change monitoring component 122 may analyze incoming changes to code objects 112 and may generate hashes that are stored internal or external to version data store 110 (e.g., externally on computing device 120). The hashes that represent the changes may be stored as delta hashes 118 and the hashes that represent the results of the changes (e.g., new version) may be stored as object hashes 116. Revision analysis component 124 may analyze the hashes to determine whether different versions 114 of code object 112 include the same content or at least a common change (e.g., bug fix A). Resource reuse component 126 may analyze the data of revision analysis component 124 to determine whether coding resources can be reused or shared for different versions of code object 112.

Computing device 120 or nodes 130A-C may access version data store 110 using content addressable storage, location addressable storage, or a combination thereof. Content addressable storage (CAS) may be data storage that stores and retrieves elements based on the content of the element and not the storage location of the element. The identifiers used to retrieve elements may be the same or similar to object hashes 116 and may be a direct representation of the content of the version (e.g., object data). For example, a content addressable storage identifier may be a hash of one or more data blocks of the versioned code object and a change to the content of the element results in the hash being updated. Content addressable storage may be a permanent-storage analogue to content-addressable memory and may be intended to store data that does not change or changes infrequently. When the stored elements remain unchanged, the content addressable storage may be referred to as Fixed Content Storage (FCS). In one example, version data store 110 may be a decentralized content addressable storage system that is the same or similar to the GIT distributed version control system and computing device 120 may access versions 114 using object hashes 116 as identifiers.

Location addressable storage is different from content addressable storage and may store and retrieve versions 114 based on location identifiers as opposed to content identifiers. The location identifier may identify a particular location where the versioned code object is being stored and may be independent from the content of the stored version. Whether the content is changed after it is stored may have no effect on the location identifier used to retrieve the stored version. A location identifier may identify a file based on a file name or storage path (e.g., relative or absolute path) or may identify a record based on a key (e.g., object identifier (MD)) and neither the file name, storage path, or key may be effected when the content of the file or record is changed.

Nodes 130A-C may provide coding resources that may create, modify, configure, execute, apply, instantiate, or deploy code objects 112 of version data store 110. In one example, nodes 130A-C may be separate from version data store 110 and may submit requests to access a code object and receive one or more versions of the code object. In another example, one or more of the nodes 130A-C may be integrated with the version data store 110 and may provide computing resources (e.g., storage or processing power) to operate the version data store 110.

Although nodes 130A-C comprise a computing device, the term "node" may refer to a physical machine, a virtual machine, container, or a combination thereof. Nodes 130A-B may provide one or more levels of virtualization and node 130C may be absent these levels of virtualization. The one or more levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Node 130A node may provide hardware level virtualization by running a hypervisor 132 that provides hardware resources to one or more virtual machines 134. Hypervisor 132 may be any program or combination of programs and may run directly on the hardware (e.g., bare-metal hypervisor) or may run on or within a host operating system (not shown). The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 134 executing a guest operating system 136.

Guest operating system 136 may be any program or combination of programs that are capable of managing computing resources of virtual machine 134 and/or node 130A. Guest operating system 136 may include a kernel comprising one or more kernel space programs (e.g., memory driver, network driver, file system driver) for interacting with virtual hardware devices or physical hardware devices. In one example, guest operating system 136 may include Linux®, Solaris®, Microsoft Windows®, Apple Mac®, other operating system, or a combination thereof.

Node 130B may be similar to node 130A and may provide operating system level virtualization by running a computer program that provides computing resources to one or more containers 131A-B. Operating system level virtualization may be implemented within the kernel of operating system 133 and may enable the existence of multiple isolated containers. In one example, operating system level virtualization may not require hardware support and may impose little to no overhead because programs within each of the containers may use the system calls of the same underlying operating system 133. This may enable node 130B to provide virtualization without the need to provide hardware emulation or be run in a virtual machine (e.g., intermediate layer) as may occur with hardware level virtualization. Operating system level virtualization may provide resource management features that isolate or limit the impact of one container (e.g., container 131A) on the resources of another container (e.g., container 131B).

The operating system level virtualization may provide a pool of computing resources that are accessible by container 131A and are isolated from one or more other containers (e.g., container 131B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 133 may include an operating system virtualizer that may provide containers 131A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 131A-B may refer to a resource-constrained process space of node 130C that can execute functionality of a program. Containers 131A-B may be referred to as a user-space instances, a virtualization engines (VE), or jails and may appear to a user as a standalone instance of the user space of operating system 133. Each of the containers 131A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 135 may be a data structure that is used to organize one or more containers 131A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 130B. In another example, the containers associated with a particular pod may be located on different nodes that are on the same or different physical machines.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
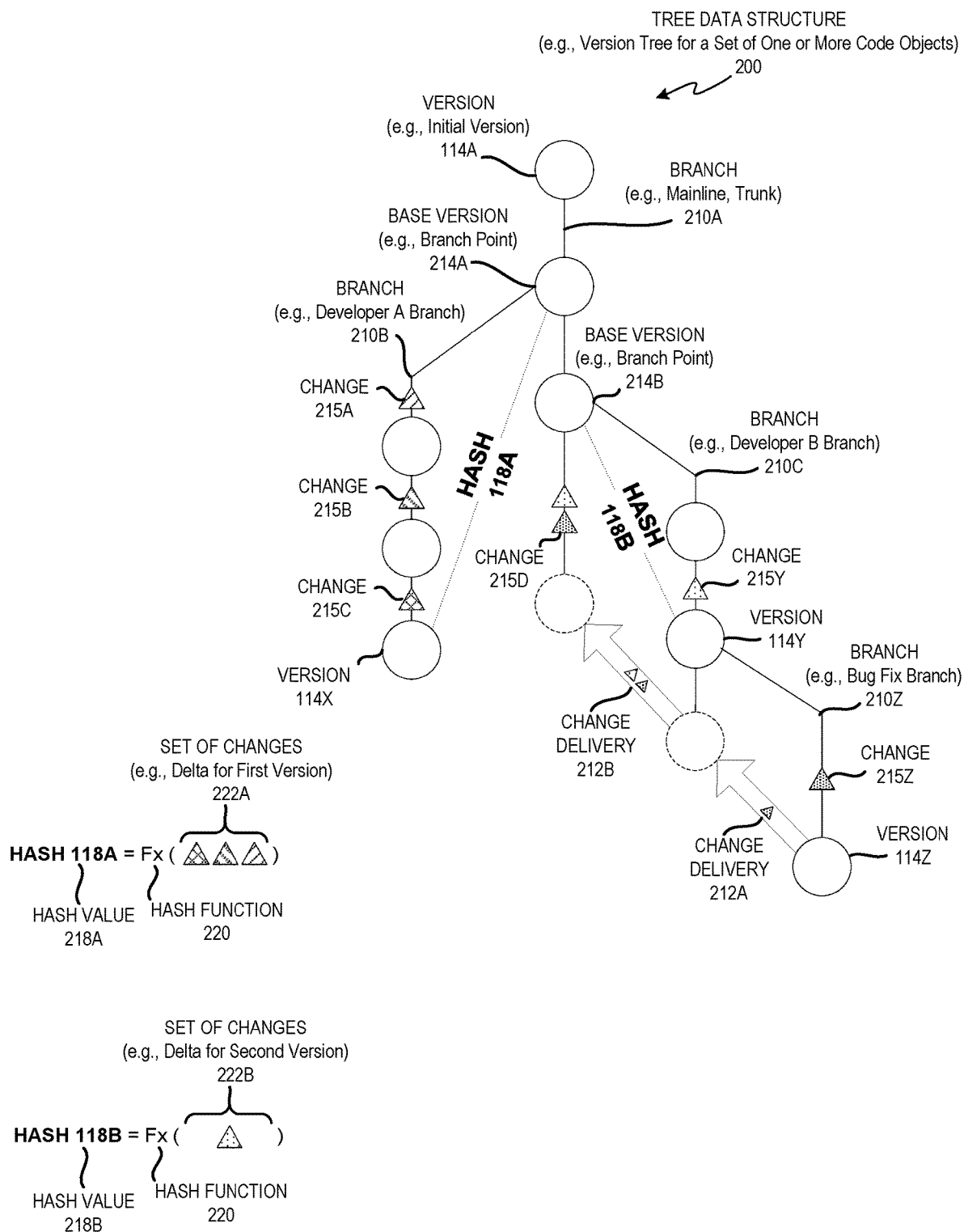
FIG. 2 depicts a block diagram of an example version tree that includes multiple versions, in accordance with one or more aspects of the present disclosure.

FIG. 2 is a line drawing illustrating an example tree data structure 200 for storing and organizing multiple versions of one or more code objects. Tree data structure 200 may be illustrated as a version tree that includes a set of nodes and a set of edges. The nodes may represent versions 114A-Z and the edges may represent changes 215A-Z. In one example, tree data structure 200 may represent versions of a particular code object. In another example, tree data structure 200 could represent versions of a set of code objects and each version may represent the set at a point in time. A version of a set of code objects may correspond to a respective version of each code object in the set (e.g., object X-v3, object Y-v1, object Z-v5). The size of the set may expand or contract in subsequent versions of the set. In one example, the tree data structure 200 may represent a program and an initial version of the program may have an initial set of source code files and the quantity of files may increase or decrease in subsequent versions of the program. In another example, the tree data structure 200 may represent versions of a configuration for one or more computing devices (e.g., a set of deployed devices). An initial version of the configuration may correspond to a set of programs on a device or a set of executable images and the quantity of programs or executable images may increase or decrease in a subsequent version of the configuration. As used anywhere in this application, the term "code object" may be interpreted to include a "set of code objects" (e.g., one or more code objects) as discussed above and in either example, tree data structure 200 may organize the versions using one or more branches 210A-Z.

Branches 210A-Z may enable code objects to be changed in parallel by isolating changes on a first branch from changes on a second branch. Each of the branches 210A-Z may function as a parent branch, a child branch, or a combination thereof. A branch may be specific to a set of one or more topics (e.g., fixes or enhancements), users (e.g., developers, IT administrators), locations (e.g., geographically separated sites), entities (e.g., teams or companies), other separation, or a combination thereof. Branch 210A may be referred to as a main branch or trunk branch because it may be absent a parent branch and may not be based on any other branch. Branches 210B and 210C may both be child branches of parent branch 210A and each may be associated with a particular user (e.g., developer A and B respectively). Branch 210C may be both a child branch of branch 210A and a parent branch for branch 210Z. Branch 210Z may be created by the owner of the parent branch (e.g., developer B) to isolate changes for a particular task (e.g., bug fix A). Each branch may branch out from any point on another branch and multiple branches may branch from the same point or different points. The point may be on the parent branch and may be a particular version. For example, branch 210B may branch from base version 214A on branch 210A and branch 210C may branch from base version 214B on branch 210A.

When comparing versions of the tree data structure, computing device 120 may determine and analyze version relationship data to identify one or more base versions for the comparison. Version relationship data may represent the relationship of a version to one or more branches (e.g., child branch, parent branch, grandparent branch) and may indicate a base version for version or branch. The version relationship data may be derived by computing device 120 from tree data structure 200 and be stored in a data store 340 or version data store 110. When comparing any two versions (e.g., target versions) the comparison operation may determine a common base version or the closest common base versions. For example, when comparing version 114X and 114Y the comparison operation may determine that base version 214A and 214B are the closest base versions because they are both on the same branch. In this instance, there may not be a single common branch version because the branches branched off of different versions on the mainline. Identifying the one or more base versions may be advantageous because there may be differences between versions that are unimportant and based on earlier decisions and using the base versions to remove those changes enables the version comparison to distinguish changes. In general, changes that are made on a particular branch may be compared but may remain isolated to the particular branch until they are delivered to one or more other branches, as illustrated by change deliveries 212A-B.

Change deliveries 212A-B may deliver changes between branches of tree data structure 200. Each of change deliveries 212A-B may integrate the changes that occurred on a source branch to a destination branch. The integration may involve creating a new version on the destination branch that will include changes from the source branch. The integration may involve one or more operations that include copying, moving, merging, removing, adding, other operation, or a combination thereof. The changes that occur on the source branch and the destination branch prior to the delivery may affect the complexity of the change delivery.

Change delivery 212A may be an example of a less complex delivery and may deliver changes made on source branch 210Z (e.g., bug fix branch) to destination branch 210C (e.g., developer B branch). There may have been no changes applied to destination branch 210C since the base version 214B of source branch 210C. Therefore, change 215Z may be delivered from source branch 210Z to destination branch 210C by making a copy of version 114Z onto destination branch 210B without reapplying change 215Z to a version on branch 210C or merging object data of two different versions.

Change delivery 212B may be an example of a more complex delivery because changes were made on destination branch 210A after the branch base version 214B of source branch 210C. As such, change delivery 212B may need to merge changes of source branch 210C with changes of destination branch 210A. Identifying the changes that can or should be delivered between versions on the same branch or different branches may be done using hashes 118A-B.

Each of hashes 118A-B may be a bit sequence that can represent the content of a set of changes. Hashes 118A-B may be the same or similar to delta hashes 118 of FIG. 1 and hashes of different change sets may have the same or different lengths. In one example, all the delta hashes may have the same length (e.g., N bits) and the length of the hash may be independent of the set of changes. In another example, the delta hashes may have different lengths and the length may be based on the size (e.g., storage size), complexity (e.g., entropy, variations), or other property of the change data for the respective set changes. Different sets of changes may include the same changes (e.g., change data) and the hashes may be compared to determine that the different sets of changes include the same changes to the code object. For example, when hashes 118A-B match (e.g., identical bit sequence) it may indicate that the corresponding sets of changes (e.g., 222A and 222B) have the same changes even though they may be made by different users on different branches at different times (e.g., same content but different metadata).

Hashes 118A and 118B may each be derived from the change data of a respective set of changes and may be used to distinguish the content of different sets of changes. The data of a change (e.g., change data) is often much smaller than the data of a version that incorporates the change (e.g., object data). Each of hashes 118A-B may be based on a respective sets of changes that were applied to a code object and each respective set may be associated with one or more versions. For example, set of changes 222A may include three different changes 215A-C that are illustrated as three delta symbols and set of changes 222B may include a single change illustrated by one delta symbol. Each set of changes may be provided as input to hash function 220.

Hash function 220 may include one or more functions that can be used to map data of arbitrary size to data of a particular size. The particular size may be an absolute size (e.g., fixed size of N bits), a relative size (e.g., percentage of input data size), other size, or a combination thereof. The values calculated by the hash function may be referred to as hash values, hash codes, digests, or simply hashes. Hash function 220 may be a hash function that enables a computing device to easily identify and compare data represented by the hash. A property of a cryptographic hash is that it may be used to verify that received input data maps to a given hash value, but if the input data is unknown it may be deliberately difficult to reconstruct it by knowing the stored hash value. In one example, the hash function may be a cryptographic hash function that is the same or similar to Secure Hash Algorithm (e.g., SHA-2, SHA-3, SHA-n) but in other examples it may be another cryptographic hash function (e.g., MD5, MDC-2) or a non-cryptographic hash function (e.g., checksum, Cyclic Redundancy check (CRC)).

Hashes 118A-B may in addition or alternatively be based on one or more delta hashes and/or an object hashes. In one example, hashes 118A-B may be based on the delta hash of one or more other changes, set of changes, or a combination thereof. In another example, hashes 118A-B may also be based on an object hash that identifies a particular code object or version of the code object (or set thereof).

Hashes 118A-B may be incorporated into a hash data structure that is associated with tree data structure 200. The hash data structure may be incorporated into tree data structure 200 or separate from tree data structure 200 (e.g., a separate structure linked to the tree data structure). The hash data structure may be a hash tree (e.g., Merkle tree), a hash list, a hash chain, other data structure, or a combination thereof. The hash tree may be a tree data structure with one or more leaf nodes and one or more non-leaf nodes. One or more of the leaf nodes (e.g., every leaf node) may be associated with the hash of a data block of an object or a set of objects. One or more of the non-leaf nodes (e.g., every non-leaf node) may be associated with the hash of one or more of the hashes of its child nodes (e.g., a hash of a hash). The hash tree may be referred to as a tree of hashes and the leaf nodes may include hashes of object data blocks and non-leaf nodes may include hashes of the hashes of respective child nodes. When a non-leaf node has multiple child nodes, the subsequent hash (e.g., hash of a hash) may involve concatenating one or more hash values. The concatenation may occur before applying the subsequent hash or after applying the subsequent hash. For example, the hash values of two leaf nodes may each be hashed and the results concatenated or may be concatenated and the result hashed. In either example, the resulting hash of a hash may be associated with one or more parent nodes of the leaf nodes. The same hash function or different hash functions may be used for the hashing of the data block and the hashing of the hash values. The creation and use of hashes 118A and 118B are discussed in more detail in regards to FIG. 3.

Figure 3:
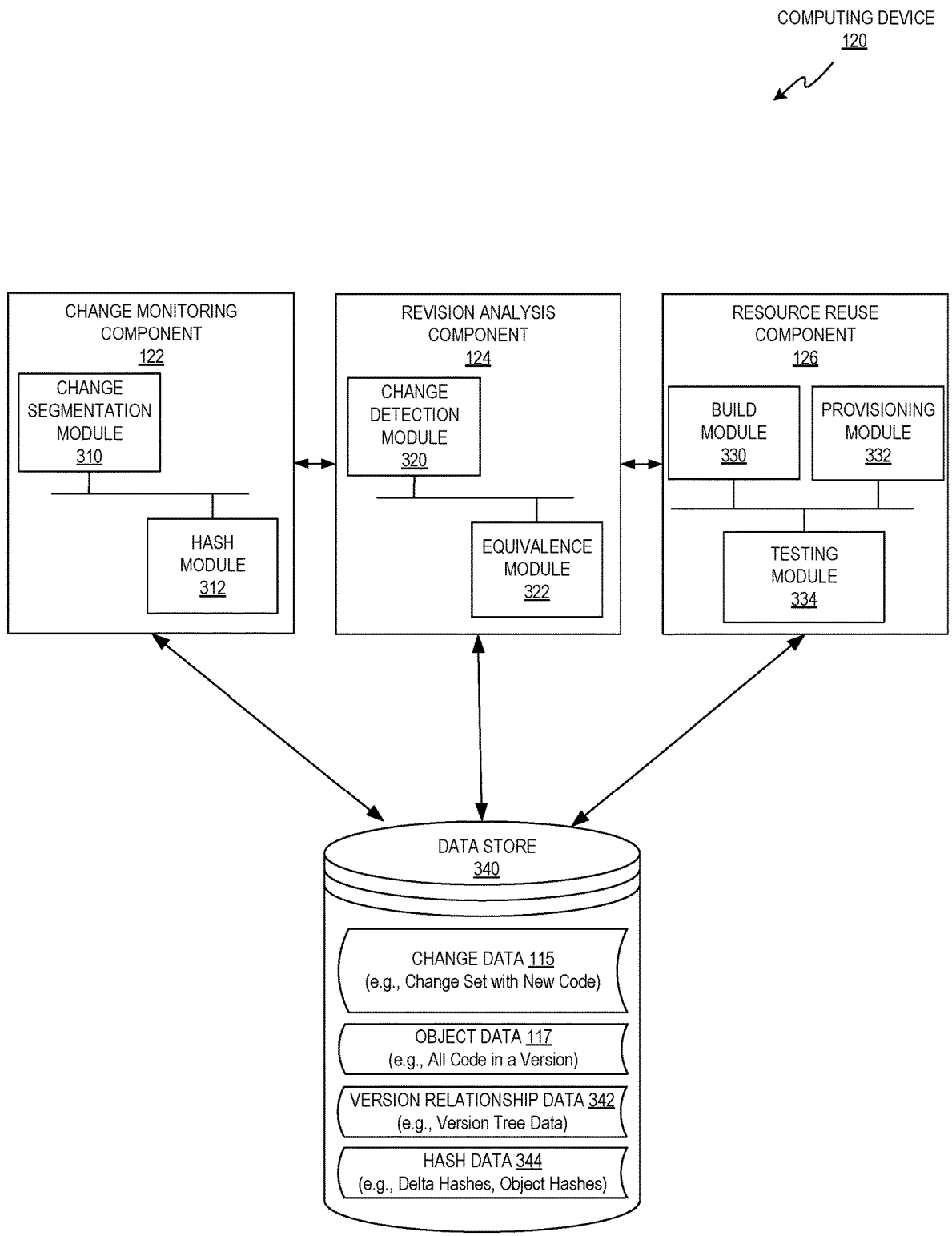
FIG. 3 depicts a block diagram of an example computing device with one or more components and modules for analyzing and comparing the different versions, in accordance with one or more aspects of the present disclosure.

FIG. 3 is a block diagram illustrating example components and modules that enable computing device 120 to detect equivalent changes in different versions of one or more code objects, in accordance with one or more aspects of the present disclosure. The components, modules, or features discussed in regards to computing device 120 may be consolidated to the computing device 120 or be spread across one or more computing devices. In the example shown in FIG. 3, computing device 120 may include change monitoring component 122, a revision analysis component 124, and a resource reuse component 126.

Change monitoring component 122 may analyze changes that effect one or more code objects. A code object may include a plurality of versions and include different types of data. In one example, the code object may include source code and the set of changes may include an addition, removal, or update of a line of text of the source code. In another example, the code object may include executable code and the set of changes may include an addition, removal, or modification of executable data of the executable code. The set of changes for one version may be made or provided by a first device and the set of changes of another version may be made or provided by a second device. The first and second devices may be different development devices (e.g., developer workstation, build machine), provisioning devices (e.g., configuration server, deployment server), other device, or a combination thereof. Change monitoring component 122 may analyze changes before, during, or after the changes are input by a user, applied to a version of the code object, received by the version data store, used to create a new version, delivered between branches, detected by a user initiated version comparison, other operation, or a combination thereof. In one example, change monitoring component 122 may include a change segmentation module 310 and a hash module 312.

Change segmentation module 310 may enable computing device 120 to determine a set of changes of a version of a code object or a version of a set of code objects. The set of changes may be applied to a code object to create the version or may be applied to the version to create another version. The changes may be tracked, aggregated, extracted, correlated, redacted, filtered, or a combination thereof and then stored in data store 340 as change data 115. Change data 115 may be in a human readable form or non-human readable form and may include position data and content data for one or more changes. The position data may indicate one or more positions in the code object that are affected by the change. The position data may identify a location in a file (e.g., line number, word count, character offset), location in a database (e.g., registry key, record number), block identifier (e.g., image offset), other position data, or a combination thereof. The content data may include data to be added or removed from the code object (e.g., new line or removed line) and/or instructions on how to cause the change (e.g., move, delete, append, concatenate, merge). The content data may include the content being added, deleted, moved, or replaced and may relate to lines of code, configuration values, data blocks of an image, other content, or a combination thereof.

Change segmentation module 310 may determine the change data of a set of changes by monitoring incoming changes or by comparing different versions. Change segmentation module 310 may monitor changes by listening, requesting, receiving, or accessing one or more incoming or outgoing changes before, during, or after they are applied to a code object. In one example, determining the changes may involve detecting the changes when they are provided by a user (e.g., as developer input or IT administrator input). In another example, determining the changes may involve detecting the changes when they are provided to the version data storage and applied to an existing version or incorporate into a new version of the code object.

Change segmentation module 310 may also or alternatively determine the set of changes by comparing existing versions of a code object. Comparing the versions may involve performing a comparison of textual data, graphic data, executable data, other data, or a combination thereof. In one example, the comparison may involve performing a textual comparison between versions of the code object to identify textual differences of a body of text (e.g., source code, configuration file). The textual comparison may be performed at any level of granularity and may be performed between one or more characters, words, lines, paragraphs, pages, files, other level, or a combination thereof. The textual differences may include one or more additions, deletions, moves, copies, font changes, formatting changes, other textual transformation, or a combination hereof. In another example, the comparison may involve performing a binary comparison between versions of the code object to identify binary differences. The binary comparison may be performed at any level of granularity and may be performed between one or more bits, bytes, packets, sectors, blocks, records, files, directories, other level, or a combination thereof. The differences may include on or more data additions, deletions, moves, copies, other data transformation, or a combination thereof. As discussed above, the comparison may or may not take into account the base versions or a common base version when performing the comparison to determine the change set.

Changes may occur in a continuous or discrete manner and change segmentation module 310 may segment the changes into sets based on one or more factors. How the changes are segmented into sets effects the data being hashed and if the same identical changes are segmented differently it may change the resulting hashes and cause the hashes to indicate the changes are not equivalent. The factors that may be used to segment the changes into sets may be based on users, devices, branches, deliveries, time periods, versions, code objects, portion of a code objects, other factors, or a combination thereof. In one example, changes that are applied to a code object to create a new version may be aggregated together as a set of changes and each new version will correspond to a different change set. In another example, all changes applied to a code object on a branch may be aggregated into a single change set even though the branch includes multiple versions. In a further example, the changes that are delivered from source branch to a target branch may be aggregated into a change set and each delivery may correspond to a change set. There are many other examples of how to segment changes into a set of changes. The segmenting may be the same or similar to aggregating, grouping, arranging, classifying, clustering, cataloging, categorizing, other term, or a combination thereof. Once the change set is identified the change data associated with the change set may be processed by hash module 312.

Hash module 312 may analyze change data 115 and generate one or more delta hashes. Hash data 344 may include one or more delta hashes and may also or alternatively include one or more object hashes. Each of the hash may correspond to one or more sets of changes, versions, code objects, or a combination thereof. Hash module 312 may enable computing device 120 to generate a delta hash in view of change data 115 and store the delta hash in data store 340 as hash data 344. Each delta hash may represent a particular set of changes that are applied or will be applied to one or more code objects. Hash module 312 may access the portion of change data 115 associated with a set of changes (e.g., one or more changes) and derive a delta hash from the portion of change data 115.

Hash module 312 may identify change data for multiple changes in the set of changes and each change may correspond to position data and content data. Hash module 312 may combine the position data and content data for each of the changes before, during, or after it is hashed. For example, the hash module may combine the individual data items and hash the resulting combination or may hash the individual data items and combine the resulting hashes, or a combination thereof. The combining may involve concatenating, appending, merging, integrating, extracting, redacting, other operation, or a combination thereof. Hash module 312 may provide the combined change data for the set of changes as input to the hash function. The hash function may include one or more mathematical transformations that are applied to the change data and may output a hash value. The hash value may be a bit sequence that is treated as a delta hash and may be added to hash data 344 in data store 340. When the hash function is a cryptographic hash function the output hash value may be a cryptographic hash value (e.g., cryptographic bit sequence). In one example, hash module 312 may incorporate the hashes into the tree data structure 200 of FIG. 2.

Revision analysis component 124 may enable computing device 120 to determine whether different versions include equivalent sets of changes. The determination may be done in response to an event initiated by a user or a device. The event may relate to a save, commit, check-in, deliver, comparison, build, deploy, provisioning, configuration, other operation, or a combination thereof. In one example, a user may initiate revision analysis component 124 by initiating a delivery or by comparing specific versions, branches, code objects, or a combination thereof. In another example, revision analysis component 124 may be initiated by a device as part of a continuous integration platform. In either example, revision analysis component 124 may access, analyze, and/or update hash data 344, change data 115, object data 117, version relationship data 342, other data, or a combination thereof. In one example, revision analysis component 124 may include a change detection module 320 and an equivalence module 322.

Change detection module 320 may identify changes included in versions of a code object or set of code objects. Change detection module 320 may begin by resolving the input to revision analysis component 124 to one or more target versions. The target versions may be referred to as source version, a destination version, or a combination thereof and may be from the same or different branches. Change detection module 320 may identify a first target version based on input and then identify a second target version in view of the input, the first target version, or a combination thereof. In one example, the input may attempt to run the most recent version (e.g., current version) and change detection module 320 may identify the second target version based on which version was previously run. Running a version may involve building, packaging, instantiating, deploying, executing, or a combination thereof. The previously run version may be an earlier version on the same branch or on a different branch (e.g., base version from parent branch). In another example, the input may initiate a change delivery for a first version and change detection module 320 may access version relationship data to identify the source branch of the first version and a destination branch (e.g., parent branch, grandparent branch, sibling branch or other branch). For each target version, the change detection module 320 may access one or more delta hashes that represent one or more sets of changes that have been incorporated into the respective version. The delta hashes may be used by equivalence module 322.

Equivalence module 322 may use hashes to compare the first target version with the second target version to determine whether the versions are equivalent or whether they contain an equivalent change. Using hashes to compare versions may be more efficient than the textual or binary comparisons discussed above. Equivalence module 322 may use the delta hashes, object hashes, other hashes, or a combination thereof when comparing the target versions. A comparison that uses delta hashes may be more effective than a comparison based on object hashes alone. This is because the object hashes may be based on metadata and identical changes may have been applied to the same identical code object but because the changes were applied by different users or at different times the object hashes may be different. Therefore, the object hashes may indicate the versions are different yet an analysis of the delta hashes may indicate the versions include equivalent changes and are equivalent.

Equivalence module 322 may access the delta hashes associated with each of the versions and compare them. Comparing delta hashes may involve performing a bit by bit comparison of a first hash and a second hash. Equivalence module 322 may perform the comparison before, during, or after performing a trimming, truncating, cleaning, or other operation. Each version may be associated with one or more sets of changes and may be associated with a set of one or more delta hashes (e.g., one for each set of changes). Comparing sets of delta hashes may involve performing comparisons between individual delta hashes in the set and may involve executing one or more sorting optimizations before, during, or after the comparisons. When at least one of the delta hashes match, the equivalence module 322 may determine there is a common change set present in both versions (e.g., bug fix A). When all of the delta hashes in the first set match all of the delta hashes in the second set then equivalence module 322 may indicate the first version and the second versions are equivalent. This may indicate they include equivalent change sets even though the different versions of the code object may not be identical (e.g., different object data).

Equivalence module 322 may provide an indication that the first and second version include at least one set of changes that are equivalent. In one example, providing an indication may involve transmitting a signal or message that indicates the set of changes of the first version are included in the second version of the coding object. In another example, providing an indication may involve updating stored data (e.g., shared storage, the compared versions, or field of code object) to indicate the set of changes of the first version are included in the second version of the coding object. In either example, equivalence module 322 may provide the indication to resource reuse component 126.

Resource reuse component 126 may detect that the versions are equivalent and associate coding resources that were associated with the first version to the second version. The coding resources may be shared between different versions of the one or more code objects. The sharing may occur concurringly and the coding resources associated with the first version may also be associated with the second version at the same time. The sharing may also or alternatively occur sequentially and the coding resources associated with the first version may be disassociated with the first version before, during, or after associating the coding resources with the second version (e.g., after first version finishes or when second version is run). The coding resources may be computing resources that include threads, processes, devices, other resource or the output thereof. The coding resources may relate to building, configuration, provisioning, deploying, testing, or other operations related to a version of a code object. In one example, resource reuse component 126 may include a build module 330, a provisioning module 332 and a testing module 334.

Build module 330 may enable a build entity or build output to be shared by multiple versions of a code object. The build entity may be a thread, process, module, machine, or other entity that may take a version of a code object as input and creates build output. The build output may include one or more binary files, executables, configuration files, programs, packages, executable images (e.g., container image, VM image, or disk image), other output, or a combination thereof. The build entity may process or transform the code object using one or more operations that involve compiling, linking, interpreting, other transformation, or a combination thereof.

Provisioning module 332 may enable a provisioning entity or provisioning output to be shared by multiple versions of a code object. The provisioning entity may be a thread, process, module, machine, or other entity that takes a version of a code object as input and provides provisioning output. The provisioning output may include an instance of one or more threads, processes, containers, virtual machines, or device that are provisioned for use with the code object. Provisioning module 332 may interact with a provisioning client or a provisioning server to configure and deploy a code object on a physical computing machine (e.g., host machine).

Testing module 334 may enable a test entity or test output to be shared by multiple versions of a code object. The test entity may be a thread, process, module, machine, or other entity that takes a version of a code object as input and creates test output. The test entity may perform static analysis, runtime analysis, other analysis, or a combination thereof. The test entity may analyze the code object with or without executing data of the code object or derived from the code object. The test output may include text (e.g., command line output), graphics (e.g., screen shots, charts), reports, executables, other output, or a combination thereof.

Figure 4:
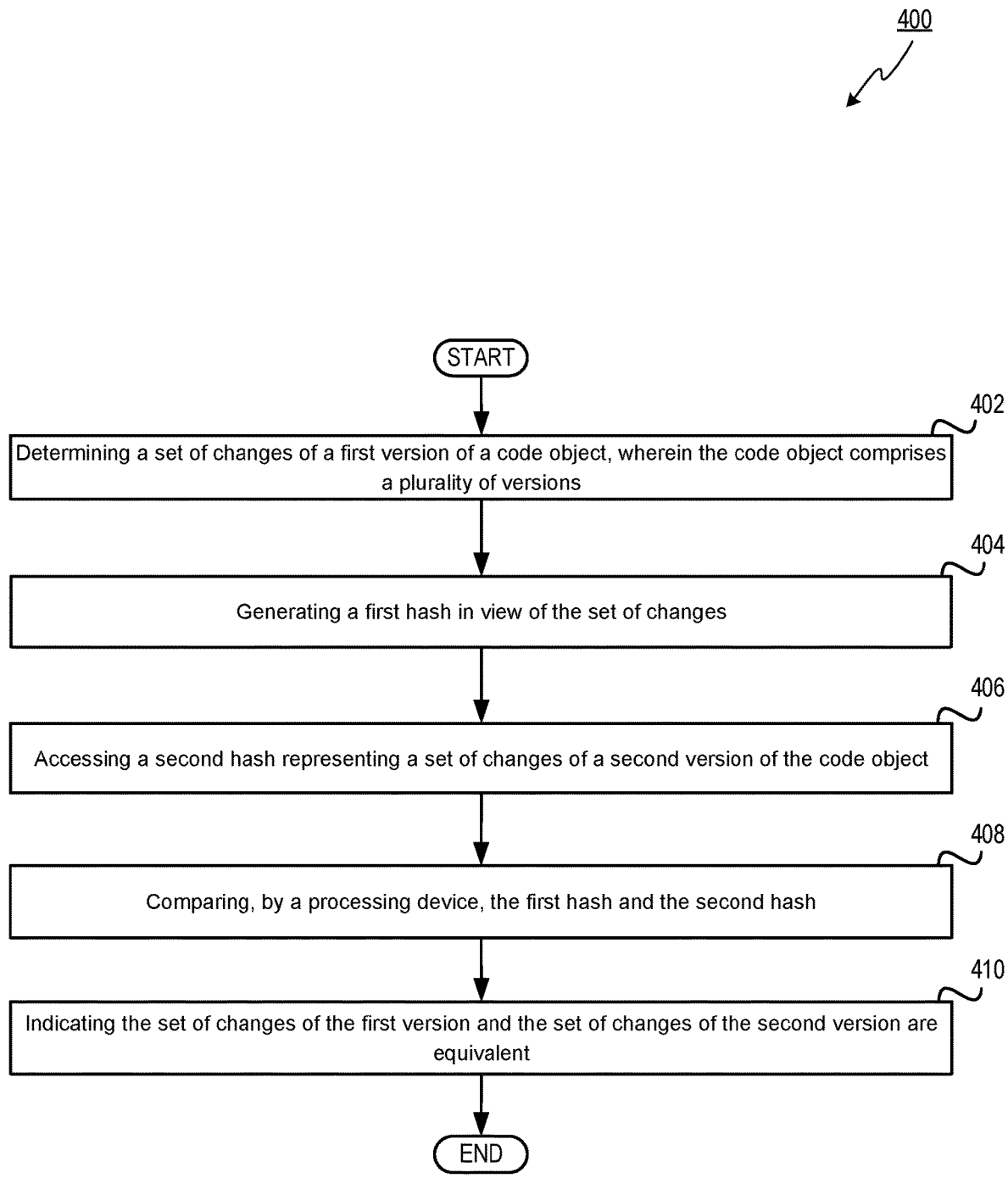
FIG. 4 depicts a flow diagram of an example method for analyzing and comparing versions, in accordance with one or more aspects of the present disclosure.

FIG. 4 depicts a flow diagram of one illustrative example of a method 400 for analyzing and comparing versions of a code object or set of code objects, in accordance with one or more aspects of the present disclosure. Method 400 and each of its individual functions, routines, subroutines, or operations may be performed by one or more processors of a computer device executing the method. In certain implementations, method 400 may be performed by a single computing device. Alternatively, methods 400 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by components 122, 124, and 126 as shown in FIGS. 1 and 3.

Method 400 may be performed by processing devices of a server device or a client device and may begin at block 402. At block 402, a processing device may determine a set of changes of a first version of a code object that includes a plurality of versions. The plurality of versions may be arranged in a tree data structure with a plurality of branches. The first and second versions may be located on the same branch or may be located on different branches that are based on different versions of the code object (e.g., different base versions). In one example, the code object may include source code and the set of changes of the first version may include at least one of an addition, a removal, or an update of a line of text of the source code. In another example, the code object may include executable code and the set of changes of the first version may include at least one of an addition, a removal, or a modification of executable data of the executable code.

Determining the set of changes may involve monitoring incoming changes or performing a textual comparison of the versions. Monitoring changes may involve determining the set of changes by accumulating a plurality of changes before, during, or after they are applied to the code object to form a new version of the code object. The textual comparison may be involve comparing the first version of the code object and a base version of the code object to identify a change to textual content of the code object. The first version and the base version may be separated by multiple versions.

At block 404, the processing device may generate a first hash in view of the set of changes. Each version of the plurality of versions may correspond to an object hash and at least one delta hash. The at least one delta hash may include a hash of particular changes in a set and the object hash may be a hash of the code object that includes the particular changes. The first hash may be a delta hash and generating the first hash may involve determining change data for multiple changes in the set of changes of the first version. The change data may include position data (e.g., line N) and content data (e.g., new text) for each of the multiple changes. The processing device may then calculate a hash value of the position data and content data using a hash function. In one example, the first hash may be based on multiple delta hashes (e.g., concatenated or a hash of hashes). The first hash may be calculated in view of a hash for each change in the set of changes of the first version.

At block 406, the processing device may access a second hash representing a set of changes of a second version of the code object. The second hash may be generated prior to creating the second version of the code object and may be based on the set of changes applied to the code object to create the second version. The set of changes of the first version may be made by a first device and the set of changes of the second version may be made by a second device. The first and second devices may correspond to different developers or IT administrators and in one example the first device may be a developer machine (e.g., developer workstation) and the second device may be a team machine (e.g., a continuous integration server).

At block 408, the processing device may compare the first hash and the second hash. The comparison may be a bitwise comparison between two hashes or between two sets of hashes. The comparison may enable the processing device to determine whether at least two hashes match (e.g., first and second hashes have same bit sequence).

At block 410, the processing device may indicate the set of changes of the first version and the set of changes of the second version are equivalent. In one example, the indication may involve providing a signal that indicates the set of changes of the first version are included in the second version of the coding object. Responsive to indicating equivalence, the processing device may associate coding resources of the first version with the second version. The coding resources may include the build output and testing resources associated with the first version of the code object. Responsive to completing the operations described herein above with references to block 410, the method may terminate.

Figure 5:
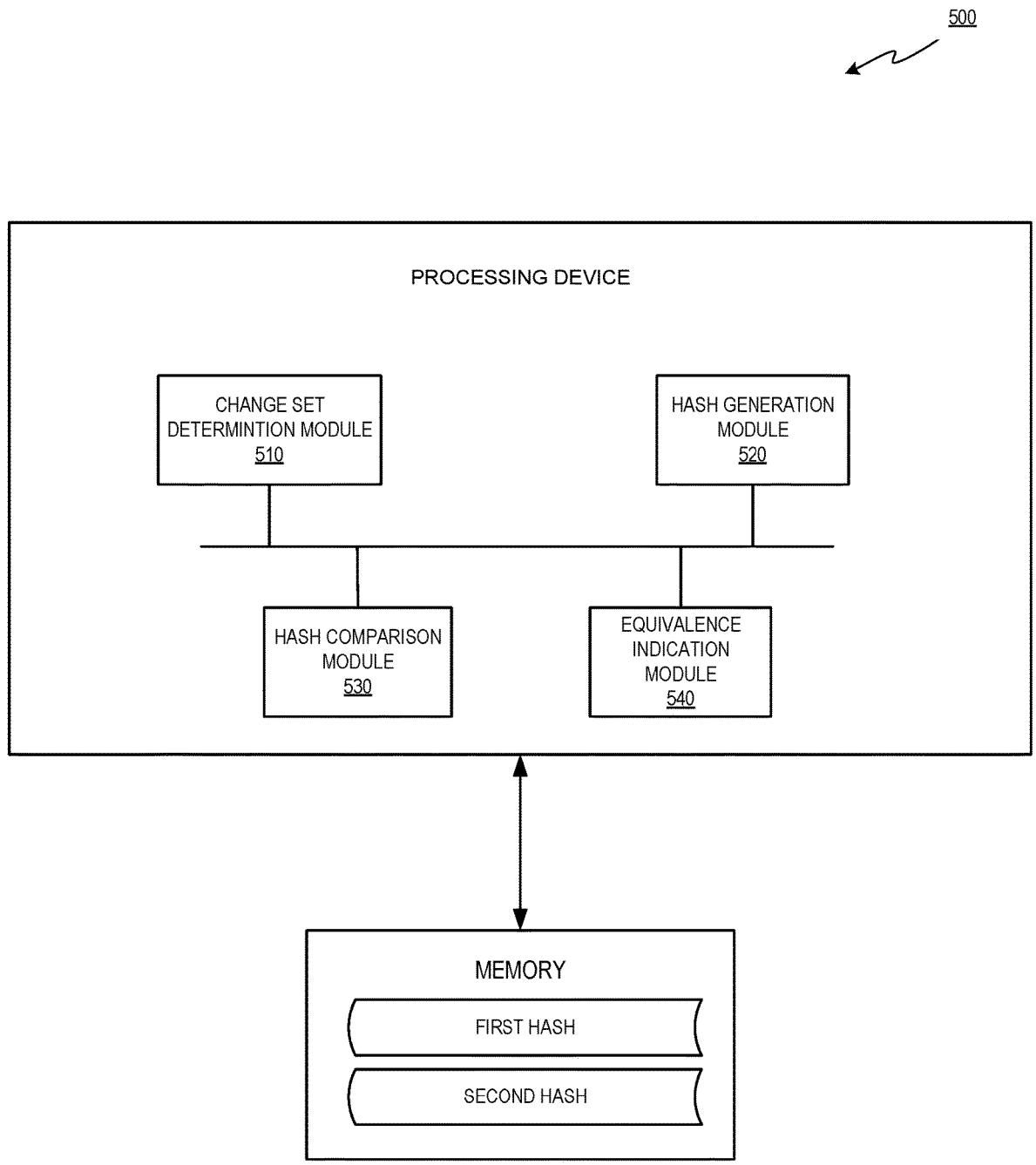
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 700 and may include one or more processing devices and one or more memory devices. In the example shown, computer system 500 may include a change set determination module 510, a hash generation module 520, a hash comparison module 530, and an equivalence indication module 540.

Change set determination module 510 may enable a processing device to determine a set of changes of a first version of a code object that includes a plurality of versions. The plurality of versions may be arranged in a tree data structure with a plurality of branches. The first and second versions may be located on the same branch or may be located on different branches that are based on different versions of the code object (e.g., different base versions). In one example, the code object may include source code and the set of changes of the first version may include at least one of an addition, a removal, or an update of a line of text of the source code. In another example, the code object may include executable code and the set of changes of the first version may include at least one of an addition, a removal, or a modification of executable data of the executable code.

Determining the set of changes may involve monitoring incoming changes or performing a textual comparison of the versions. Monitoring changes may involve determining the set of changes by accumulating a plurality of changes before, during, or after they are applied to the code object to form a new version of the code object. The textual comparison may be involve comparing the first version of the code object and a base version of the code object to identify a change to textual content of the code object. The first version and the base version may be separated by multiple versions.

Hash generation module 520 may enable the processing device to generate a first hash in view of the set of changes. Each version of the plurality of versions may correspond to an object hash and at least one delta hash. The at least one delta hash may include a hash of particular changes in a set and the object hash may be a hash of the code object that includes the particular changes. The first hash may be a delta hash and generating the first hash may involve determining change data for multiple changes in the set of changes of the first version. The change data may include position data (e.g., line N) and content data (e.g., new text) for each of the multiple changes. The processing device may then calculate a hash value of the position data and content data using a hash function. In one example, the first hash may be based on multiple delta hashes (e.g., concatenated or a hash of hashes). The first hash may be calculated in view of a hash for each change in the set of changes of the first version.

Hash comparison module 530 may enable the processing device to access and compare hashes. Hash comparison module 530 may access a second hash representing a set of changes of a second version of the code object. The second hash may be generated prior to creating the second version of the code object and may be based on the set of changes applied to the code object to create the second version. The set of changes of the first version may be made by a first device and the set of changes of the second version may be made by a second device. The first and second devices may correspond to different developers or IT administrators and in one example the first device may be a developer machine (e.g., developer workstation) and the second device may be a team machine (e.g., a continuous integration server). The processing device may compare the first hash and the second hash. The comparison may be a bitwise comparison between two hashes or between two sets of hashes. The comparison may enable the processing device to determine whether at least two hashes match (e.g., first and second hashes have same bit sequence).

Equivalence indication module 540 may enable the processing device to indicate the set of changes of the first version and the set of changes of the second version are equivalent. In one example, the indication may involve providing a signal that indicates the set of changes of the first version are included in the second version of the coding object. Responsive to indicating equivalence, the processing device may associate coding resources of the first version with the second version. The coding resources may include the build output and testing resources associated with the first version of the code object.

Figure 6:
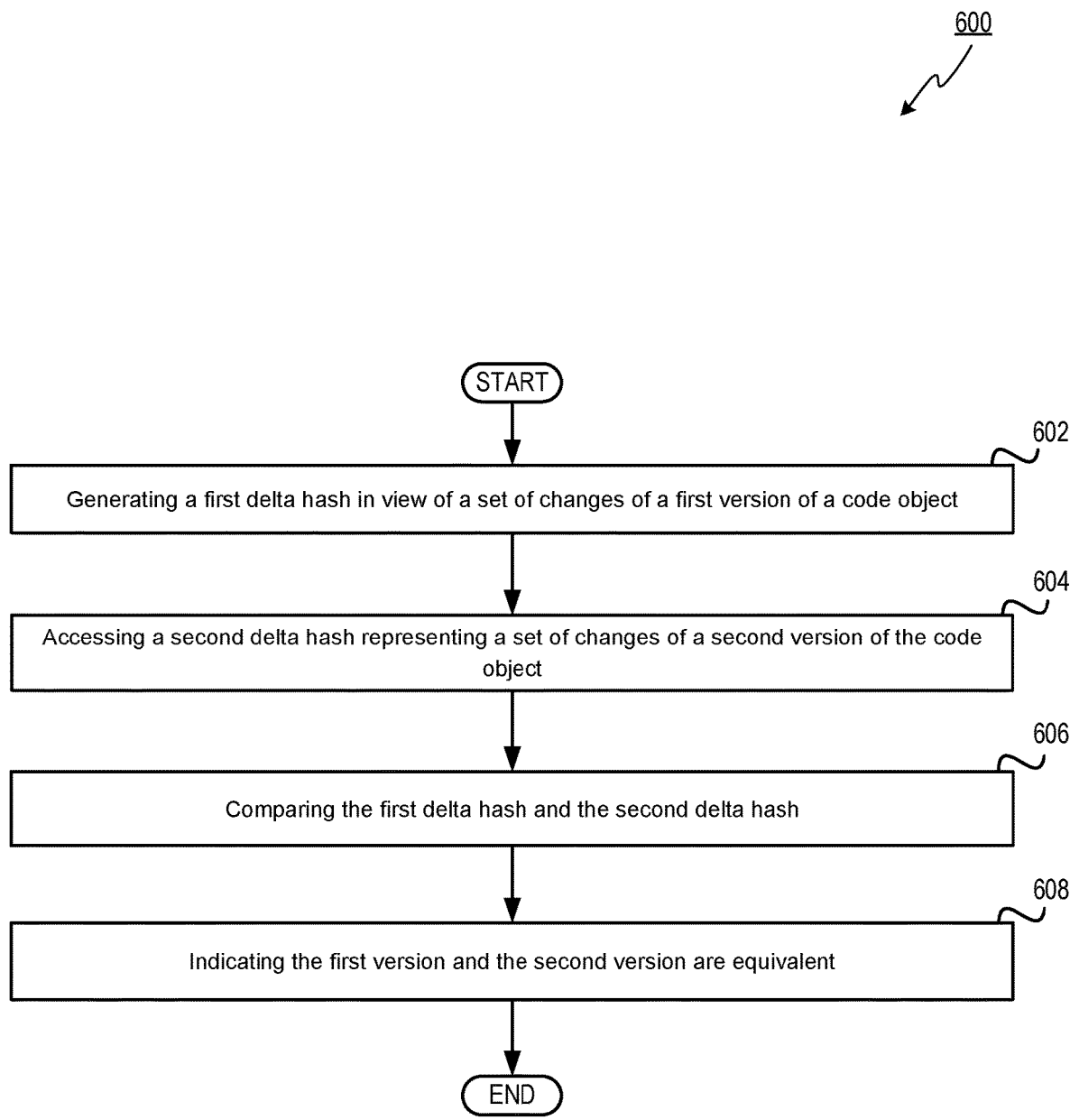
FIG. 6 depicts a flow diagram of another example method for analyzing and comparing versions, in accordance with one or more aspects of the present disclosure.

FIG. 6 depicts a flow diagram of one illustrative example of a method 600 for analyzing and comparing versions of a code object or set of code objects, in accordance with one or more aspects of the present disclosure. Method 600 may be similar to method 400 and each of its individual functions, routines, subroutines, or operations may be performed by one or more processors of the computer device executing the method. Method 600 may be performed by processing devices of a server device or a client device and may begin at block 602.

At block 602, a processing device may generate a first delta hash in view of the set of changes. Each version of the plurality of versions may correspond to an object hash and at least one delta hash. The at least one delta hash may include a hash of particular changes in a set and the object hash may be a hash of the code object that includes the particular changes. Generating the first delta hash may involve determining change data for multiple changes in the set of changes of the first version. The change data may include position data (e.g., line N) and content data (e.g., new text) for each of the multiple changes. The processing device may then calculate a delta hash value of the position data and content data using a hash function. In one example, the first delta hash may be based on multiple delta hashes (e.g., concatenated or a hash of hashes). The first delta hash may be calculated in view of a delta hash for each change in the set of changes of the first version.

At block 604, the processing device may access a second delta hash representing a set of changes of a second version of the code object. The second delta hash may be generated prior to creating the second version of the code object and may be based on the set of changes applied to the code object to create the second version. The set of changes of the first version may be made by a first device and the set of changes of the second version may be made by a second device. The first and second devices may correspond to different developers or IT administrators and in one example the first device may be a developer machine (e.g., developer workstation) and the second device may be a team machine (e.g., a continuous integration server).

At block 606, the processing device may compare the first delta hash and the second delta hash. The comparison may be a bitwise comparison between two delta hashes or between two sets of delta hashes. The comparison may enable the processing device to determine whether at least two delta hashes match (e.g., first and second delta hashes have same bit sequence).

At block 608, the processing device may indicate the set of changes of the first version and the set of changes of the second version are equivalent. In one example, the indication may involve providing a signal that indicates the set of changes of the first version are included in the second version of the coding object. Responsive to indicating equivalence, the processing device may associate coding resources of the first version with the second version. The coding resources may include the build output and testing resources associated with the first version of the code object. Responsive to completing the operations described herein above with references to block 608, the method may terminate.

Figure 7:
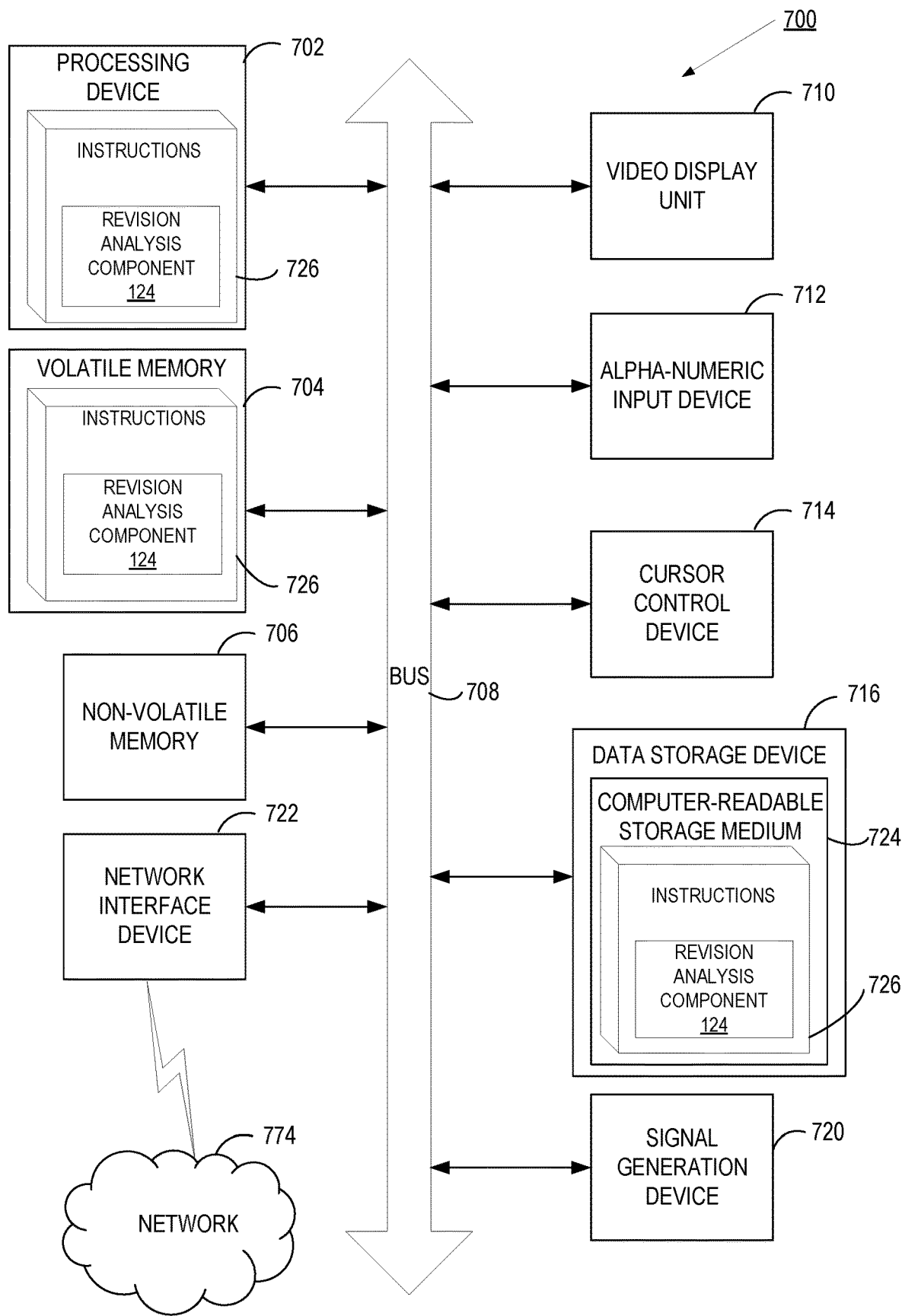
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing device 120 or one or more of the nodes 130A-Z of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding manifest generation component 124 of FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: determining a set of changes of a first version of a code object, wherein the code object comprises a plurality of versions; generating a first hash in view of the set of changes; accessing a second hash representing a set of changes of a second version of the code object; comparing, by a processing device, the first hash and the second hash; and indicating the set of changes of the first version and the set of changes of the second version are equivalent.

Example 2 is a method of example 1, wherein each version of the plurality of versions corresponds to an object hash and at least one delta hash, wherein the at least one delta hash comprises a hash of particular changes in a set and the object hash comprises a hash of a version of the code object that includes the particular changes.

Example 3 is a method of example 1, wherein the code object comprises source code and wherein the set of changes of the first version comprises at least one of an addition, a removal, or an update of a line of text of the source code.

Example 4 is a method of example 1, wherein the first hash comprises a delta hash that is calculated in view of change data for each change in the set of changes of the first version, wherein the change data comprises position data and content data for a text change to the code object.

Example 5 is a method of example 1, wherein the first hash comprises a delta hash and wherein generating the first hash comprises: determining change data for multiple changes in the set of changes of the first version, wherein the change data comprises position data and content data for each of the multiple changes; and calculating a hash value of the position data and content data using a hash function.

Example 6 is a method of example 1, further comprising generating the second hash representing the set of changes of the second version prior to creating the second version of the code object, wherein the set of changes are applied to the code object to create the second version.

Example 7 is a method of example 1, wherein the set of changes of the first version are made by a first device and the set of changes of the second version are made by a second device.

Example 8 is a method of example 1, further comprising responsive to the indicating equivalence, associating coding resources of the first version with the second version, wherein the coding resources comprise build output and testing resources.

Example 9 is a method of example 1, wherein the plurality of versions of the coding object are arranged in a tree data structure that comprises a plurality of branches, and wherein the first version and the second version are located on branches that are based on different versions of the code object.

Example 10 is a method of example 1, wherein determining the set of changes comprises performing a textual comparison between the first version of the code object and a base version of the code object to identify a change to textual content of the code object, wherein the first version and the base version are separated by multiple versions of the plurality of versions.

Example 11 is a method of example 1, wherein the indicating comprises providing a signal that indicates the set of changes of the first version are included in the second version of the coding object.

Example 12 is a system comprising: a memory and a processing device communicably coupled to the memory, the processing device configured to: determine a set of changes of a first version of a code object, wherein the code object comprises a plurality of versions; generate a first hash in view of the set of changes; access a second hash representing a set of changes of a second version of the code object; compare the first hash and the second hash; and indicate the set of changes of the first version and the set of changes of the second version are equivalent.

Example 13 is a system of example 12, wherein each version of the plurality of versions corresponds to an object hash and at least one delta hash, wherein the at least one delta hash comprises a hash of particular changes in a set and the object hash comprises a hash of a version of the code object that includes the particular changes.

Example 14 is a system of example 12, wherein the code object comprises source code and wherein the set of changes of the first version comprises at least one of an addition, a removal, or an update of a line of text of the source code.

Example 15 is a system of example 12, wherein the first hash comprises a delta hash that is calculated in view of change data for each change in the set of changes of the first version, wherein the change data comprises position data and content data for a text change to the code object.

Example 16 is a non-transitory machine-readable storage medium comprising instructions that cause a processing device to: generating a first delta hash in view of a set of changes of a first version of a code object; accessing a second delta hash representing a set of changes of a second version of the code object; comparing the first delta hash and the second delta hash; and indicating the first version and the second version are equivalent.

Example 17 is a non-transitory machine-readable storage medium of example 16, wherein each version of the plurality of versions corresponds to an object hash and at least one delta hash, wherein the at least one delta hash comprises a hash of particular changes in a set and the object hash comprises a hash of the code object that includes the particular changes.

Example 18 is a non-transitory machine-readable storage medium of example 16, wherein the code object comprises source code and wherein the set of changes of the first version comprises at least one of an addition, a removal, or an update of a line of text of the source code.

Example 19 is a non-transitory machine-readable storage medium of example 16, wherein the first hash comprises a delta hash that is calculated in view of change data for each change in the set of changes of the first version, wherein the change data comprises position data and content data for a text change to the code object.

Example 20 is a non-transitory machine-readable storage medium of example 16, wherein the first hash comprises a delta hash and wherein generating the first hash comprises: determining change data for multiple changes in the set of changes of the first version, wherein the change data comprises position data and content data for each of the multiple changes; and calculating a hash value of the position data and content data using a hash function.

Example 21 is an apparatus comprising: a memory and a processing device communicably coupled to the memory, the processing device configured to: generate a first delta hash in view of the set of changes of a first version of a code object; access a second delta hash representing a set of changes of a second version of the code object; compare the first delta hash and the second delta hash; and indicate the set of changes of the first version and the set of changes of the second version are equivalent.

Example 22 is an apparatus of example 21, wherein each version of the plurality of versions corresponds to an object hash and at least one delta hash, wherein the at least one delta hash comprises a hash of particular changes in a set and the object hash comprises a hash of the code object that includes the particular changes.

Example 23 is an apparatus of example 21, wherein the code object comprises source code and wherein the set of changes of the first version comprises at least one of an addition, a removal, or an update of a line of text of the source code.

Example 24 is an apparatus of example 21, wherein the first hash comprises a delta hash that is calculated in view of change data for each change in the set of changes of the first version, wherein the change data comprises position data and content data for a text change to the code object.

Example 25 is an apparatus of example 21, wherein the first hash comprises a delta hash and wherein generating the first hash comprises: determining change data for multiple changes in the set of changes of the first version, wherein the change data comprises position data and content data for each of the multiple changes; and calculating a hash value of the position data and content data using a hash function.

Example 26 is an apparatus of example 21, further comprising generating the second hash representing the set of changes of the second version prior to creating the second version of the code object, wherein the set of changes are applied to the code object to create the second version.

Example 27 is an apparatus of example 21, wherein the set of changes of the first version are made by a first device and the set of changes of the second version are made by a second device.

Example 28 is an apparatus of example 21, further comprising responsive to the indicating equivalence, associating coding resources of the first version with the second version, wherein the coding resources comprise build output and testing resources.

Example 29 is an apparatus of example 21, wherein the plurality of versions of the coding object are arranged in a tree data structure that comprises a plurality of branches, and wherein the first version and the second version are located on branches that are based on different versions of the code object.

Example 30 is a system comprising: a means for determining a set of changes of a first version of a code object, wherein the code object comprises a plurality of versions; a means for generating a first hash in view of the set of changes; a means for accessing a second hash representing a set of changes of a second version of the code object; a means for comparing the first hash and the second hash; and a means for indicating the set of changes of the first version and the set of changes of the second version are equivalent.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "generating," "accessing," "comparing," "indicating," "analyzing," "detecting," "providing," "transmitting," "updating," "enhancing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 600 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   determining a set of changes of a first version of a code object, wherein the code object is associated with a plurality of versions;
   generating a first hash based on the set of changes, wherein the first hash comprises a plurality of delta hashes that are calculated based on change data in the set of changes of the first version of the code object, wherein the change data comprises position data and content data;
   accessing a second hash representing a set of changes of a second version of the code object, wherein the second hash comprises a plurality of delta hashes that are calculated based on change data in the set of changes of the second version of the code object, wherein the change data in the set of changes of the second version of the code object comprises position data and content data;
   comparing the plurality of delta hashes of the first hash and the plurality of delta hashes of the second hash;
   in response to determining that all of the delta hashes of the first hash match all of the delta hashes of the second hash, indicating the set of changes of the first version and the set of changes of the second version are equivalent and that the first hash matches the second hash;
   in response to the indication, assigning, to the second version, at least one virtual machine used by the first version; and
   executing the second version using the at least one virtual machine.

2. The method of claim 1, wherein each version of the plurality of versions corresponds to at least an object hash, wherein the object hash comprises a hash of a version of the code object that includes the particular changes.

3. The method of claim 1, wherein the code object comprises source code and wherein the set of changes of the first version comprises at least one of an addition, a removal, or an update of a line of text of the source code.

4. The method of claim 1, wherein generating the first hash comprises:
   determining the change data for multiple changes in the set of changes of the first version; and calculating a hash value of the position data and content data using a hash function.

5. The method of claim 1, further comprising generating the second hash representing the set of changes of the second version prior to creating the second version of the code object, wherein the set of changes are applied to the code object to create the second version.

6. The method of claim 1, wherein the set of changes of the first version are made by a first device and the set of changes of the second version are made by a second device.

7. The method of claim 1, wherein the plurality of versions of the coding object are arranged in a tree data structure that comprises a plurality of branches, and wherein the first version and the second version are located on branches that are based on different versions of the code object.

8. The method of claim 1, wherein determining the set of changes comprises performing a textual comparison between the first version of the code object and a base version of the code object to identify a change to textual content of the code object, wherein the first version and the base version are separated by multiple versions of the plurality of versions.

9. The method of claim 1, wherein the indicating comprises providing a signal that indicates the set of changes of the first version are included in the second version of the coding object.

10. A system comprising:
a memory; and
a processing device communicably coupled to the memory, the processing device to:
determine a set of changes of a first version of a code object, wherein the code object comprises a plurality of versions;
generate a first hash based on the set of changes, wherein the first hash comprises a plurality of delta hashes that are calculated based on change data in the set of changes of the first version of the code object, wherein the change data comprises position data and content data;
access a second hash representing a set of changes of a second version of the code object, wherein the second hash comprises a plurality of delta hashes that are calculated based on change data in the set of changes of the second version of the code object, wherein the change data in the set of changes of the second version of the code object comprises position data and content data;
compare the plurality of delta hashes of the first hash and the plurality of delta hashes of the second hash;
in response to a determination that all of the delta hashes of the first hash match all of the delta hashes of the second hash, indicate the set of changes of the first version and the set of changes of the second version are equivalent and that the first hash matches the second hash;
in response to the indication, assign, to the second version, at least one virtual machine used by the first version; and
execute the second version using the at least one virtual machine.

11. The system of claim 10, wherein each version of the plurality of versions corresponds to at least an object hash, wherein the object hash comprises a hash of a version of the code object that includes the particular changes.

12. The system of claim 10, wherein the code object comprises source code and wherein the set of changes of the first version comprises at least one of an addition, a removal, or an update of a line of text of the source code.

13. A non-transitory machine-readable storage medium comprising instructions that cause a processing device to:
determine a set of changes of a first version of a code object, wherein the code object is associated with a plurality of versions;
generate a first hash based on the set of changes, wherein the first hash comprises a plurality of delta hashes that are calculated based on change data in the set of changes of the first version of the code object, wherein the change data comprises position data and content data;
access a second hash representing a set of changes of a second version of the code object, wherein the second hash comprises a plurality of delta hashes that are calculated based on change data in the set of changes of the second version of the code object, wherein the change data in the set of changes of the second version of the code object comprises position data and content data;
compare the plurality of delta hashes of the first hash and the plurality of delta hashes of the second hash;
in response to a determination that all of the delta hashes of the first hash match all of the delta hashes of the second hash, indicate the set of changes of the first version and the set of changes of the second version are equivalent and that the first hash matches the second hash;
in response to the indication, assigning, to the second version, at least one virtual machine used by the first version; and
execute the second version using the at least one virtual machine.

14. The non-transitory machine-readable storage medium of claim 13, wherein each version of the plurality of versions corresponds to at least an object hash, wherein the object hash comprises a hash of the code object that includes the particular changes.

15. The non-transitory machine-readable storage medium of claim 13, wherein the code object comprises source code and wherein the set of changes of the first version comprises at least one of an addition, a removal, or an update of a line of text of the source code.

16. The non-transitory machine-readable storage medium of claim 13, wherein generating the first hash comprises:
determining the change data for multiple changes in the set of changes of the first version; and
calculating a hash value of the position data and content data using a hash function.

* * * * *